United States Patent [19]

Georgopoulos

[11] Patent Number: 4,639,987

[45] Date of Patent: Feb. 3, 1987

[54] APPARATUS FOR PRODUCING SIMULTANEOUSLY A PLURALITY OF VENETIAN BLINDS

[75] Inventor: George Georgopoulos, Pine Brook, N.J.

[73] Assignee: Levolor Lorentzen, Inc., Parsippany, N.J.

[21] Appl. No.: 725,020

[22] Filed: Apr. 19, 1985

[51] Int. Cl.[4] .............................................. B23P 19/04

[52] U.S. Cl. ...................................................... 29/24.5

[58] Field of Search ................... 29/24.5, 34 R, 564.6, 29/564.8, 874, 884

[56] References Cited

U.S. PATENT DOCUMENTS

| | | | |
|---|---|---|---|
| 1,426,827 | 8/1922 | Eustice | 29/884 |
| 2,273,099 | 2/1942 | Gilbert | 29/884 |
| 2,827,686 | 3/1958 | Adelman | 29/24.5 |
| 2,917,810 | 12/1959 | Wilson | 29/24.5 |
| 4,188,693 | 2/1980 | Edixhoven | 29/24.5 |

*Primary Examiner*—Howard N. Goldberg
*Assistant Examiner*—Steven Nichols

[57] ABSTRACT

This invention discloses a method and apparatus for making venetian blinds. The apparatus discloses the ability to make more than one blind at a time in order to increase the output of the apparatus.

3 Claims, 6 Drawing Figures

APPARATUS FOR PRODUCING SIMULTANEOUSLY A PLURALITY OF VENETIAN BLINDS

BACKGROUND OF THE INVENTION

The present invention relates to venetian blinds, and more specifically to a method of and apparatus for making venetian blinds semi-automatically. Such machines are known in the art, and applicant is aware of three patents relating to the manufacture of venetian blinds, namely U.S. Pat. Nos. 2,635,333; 2,532,294; and 3,292,232.

It is an object of the invention to provide a semi-automatic venetian blind assembling machine in which a plurality of venetian blinds can be manufactured simultaneously.

BRIEF DESCRIPTION OF THE DRAWINGS

The invention is illustrated, by way of example, in the attached drawings, in which.

DETAILED DESCRIPTION OF A PREFERRED EMBODIMENT

Figure 1:
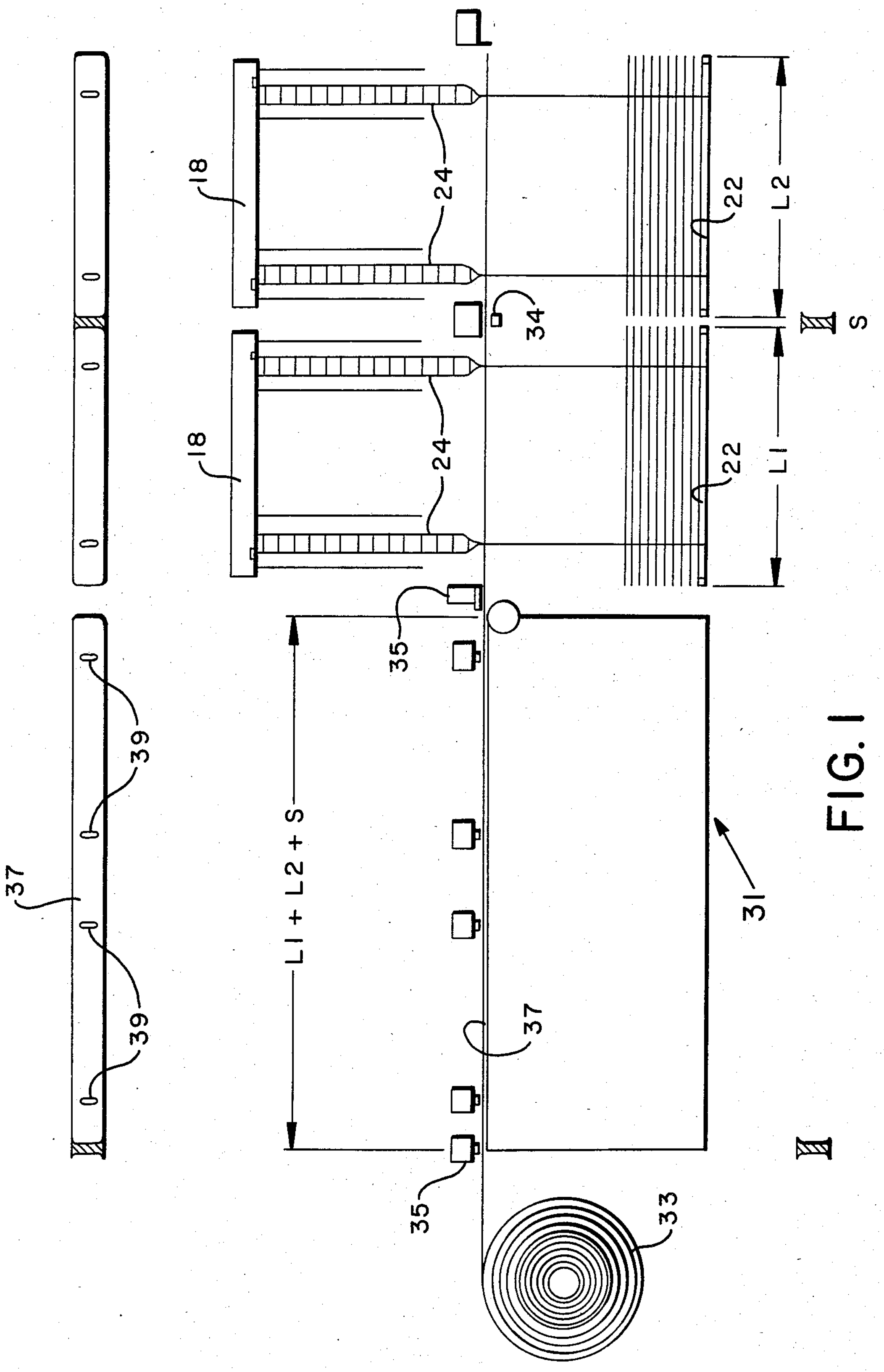
FIG. 1 diagramatically illustrates a venetian blind assembly machine according to the invention.
Figure 2:
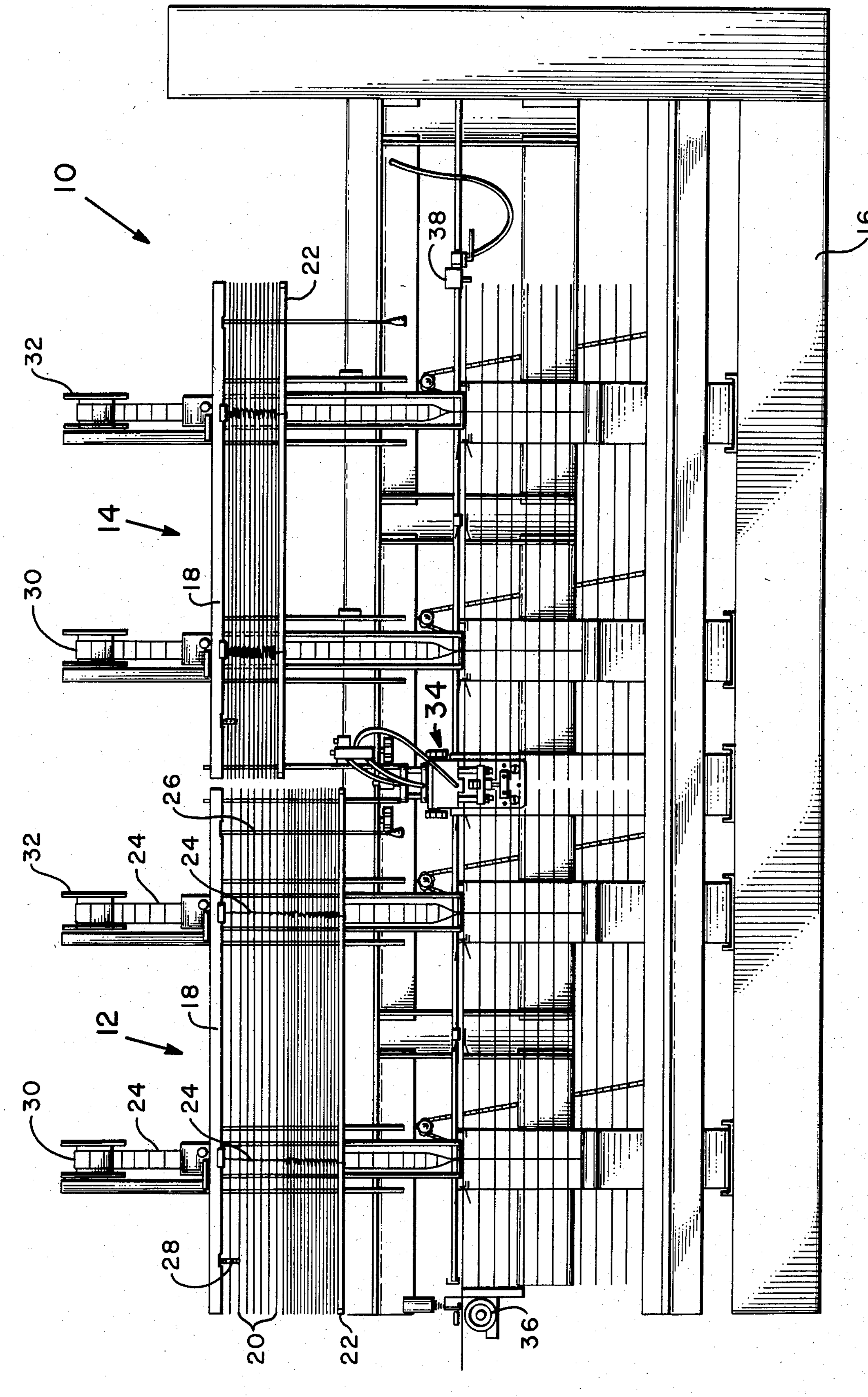
FIG. 2 is a front view of a venetian blind assembling machine according to the present invention having two adjacent stations, and including a slat cutting device between the stations.

Referring now to the drawings in detail, FIGS. 1 and 2 show a venetian blind assembly machine according to the present invention, generally designated with reference numeral 10. It comprises two adjacent stations 12, 14, mounted on a common frame 16. However, there could be more than two such stations. Each station 12, 14 is capable of assembling a venetian blind 13.

As is well known in the art, such venetian blinds consist of a blind head or head rail 18, a plurality of parallel slats 20, a bottom rail 22, and a number of ladders 24 (in the blinds illustrated there are two). The venetian blind also comprises a lift cord 26 for lifting and lowering the slats 20 and a wand 28 for tilting the slats.

Ordinarily, one venetian blind at a time is produced on one machine.

However, according to the present invention, a plurality of blinds can be produced simultaneously. In the illustrated example two blinds are manufactured. However, three, four or more such blinds could be manufactured simultaneously, following the same principle.

The venetian blinds 13 are assembled each from a bottom rail 22 and a head rail 18 held in spaced parallel relationship thereto. Ladders 24 are vertically suspended from reels 30, 32. Aluminum stock material in roll form is stored on the side of the machine on a roll 33 and is first fed to a punching station 31 where the stock material is cut to a length corresponding to the length of material required for the number of venetian blinds produced in the machine.

In the illustrated case this amounts to twice the width $(l_1+l_2)$ of the blind plus the spacing between stations(s). At both ends.the stock material is rounded by dies 35. Simultaneously, dies 39 punch holes in the stock material 37 at locations where in the finished blinds the lift and tilt cords pass through the slats.

Between the two stations there is arranged a slat cutting device 34. As shown in FIG. 1, a length of material roughly equivalent to two blinds is passed through the ladders 24 of both stations by a roller 36 against a stop 38 which has a trip mechanism operatively connected to the slat cutter 34 to cut the material at the location shown. The slats of both stations are immediately pushed down. Thereupon, the roller 36 may rapidly pass, or throw, slat material consisting of a length of two venetian blinds through the ladders 24, and the procedure is repeated.

Figure 3:
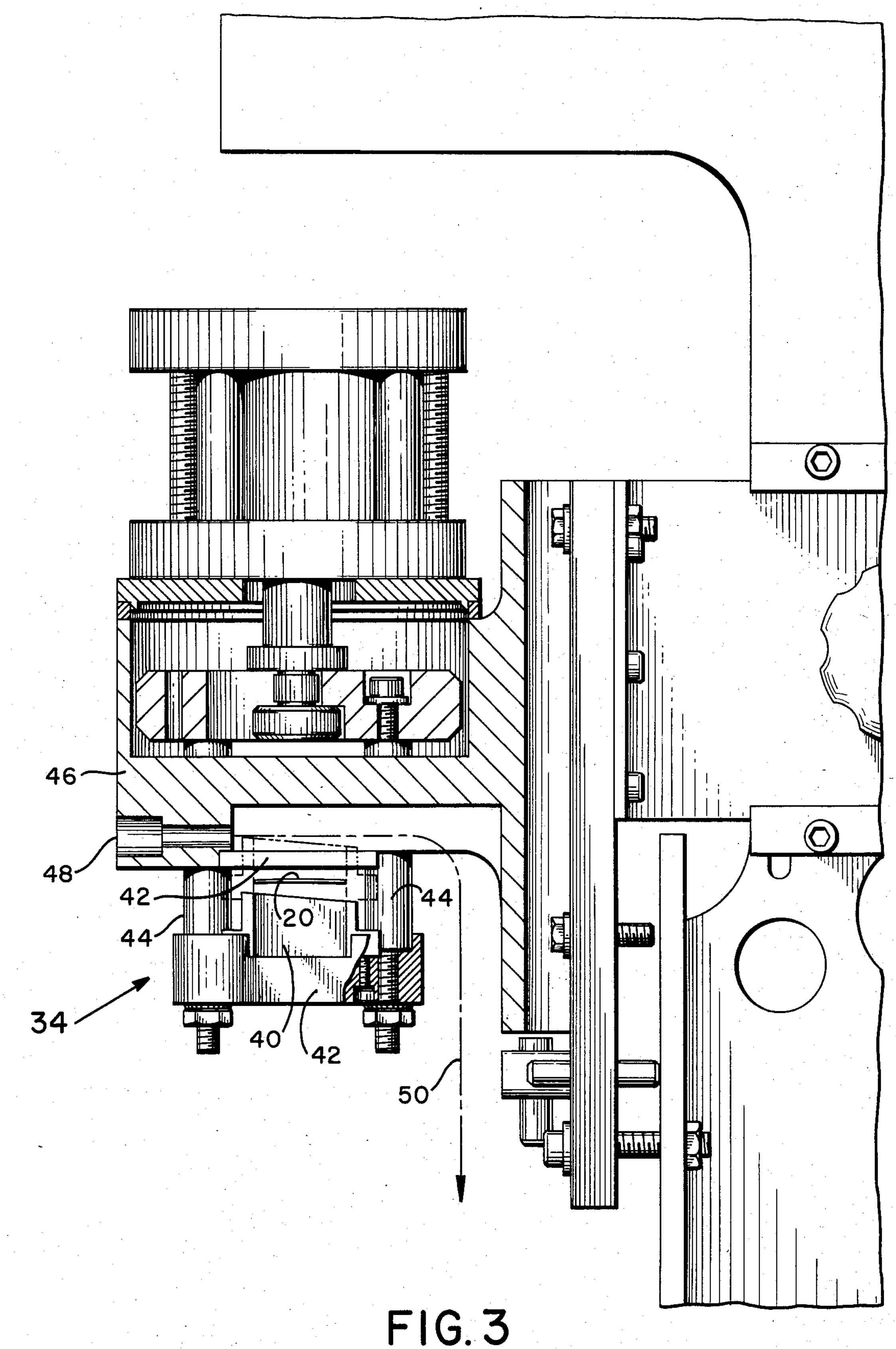
FIG. 3 is a side view, partially in section, of the slat cutting device of FIG. 2 on a scale considerably larger than in FIG. 2.
Figure 4:
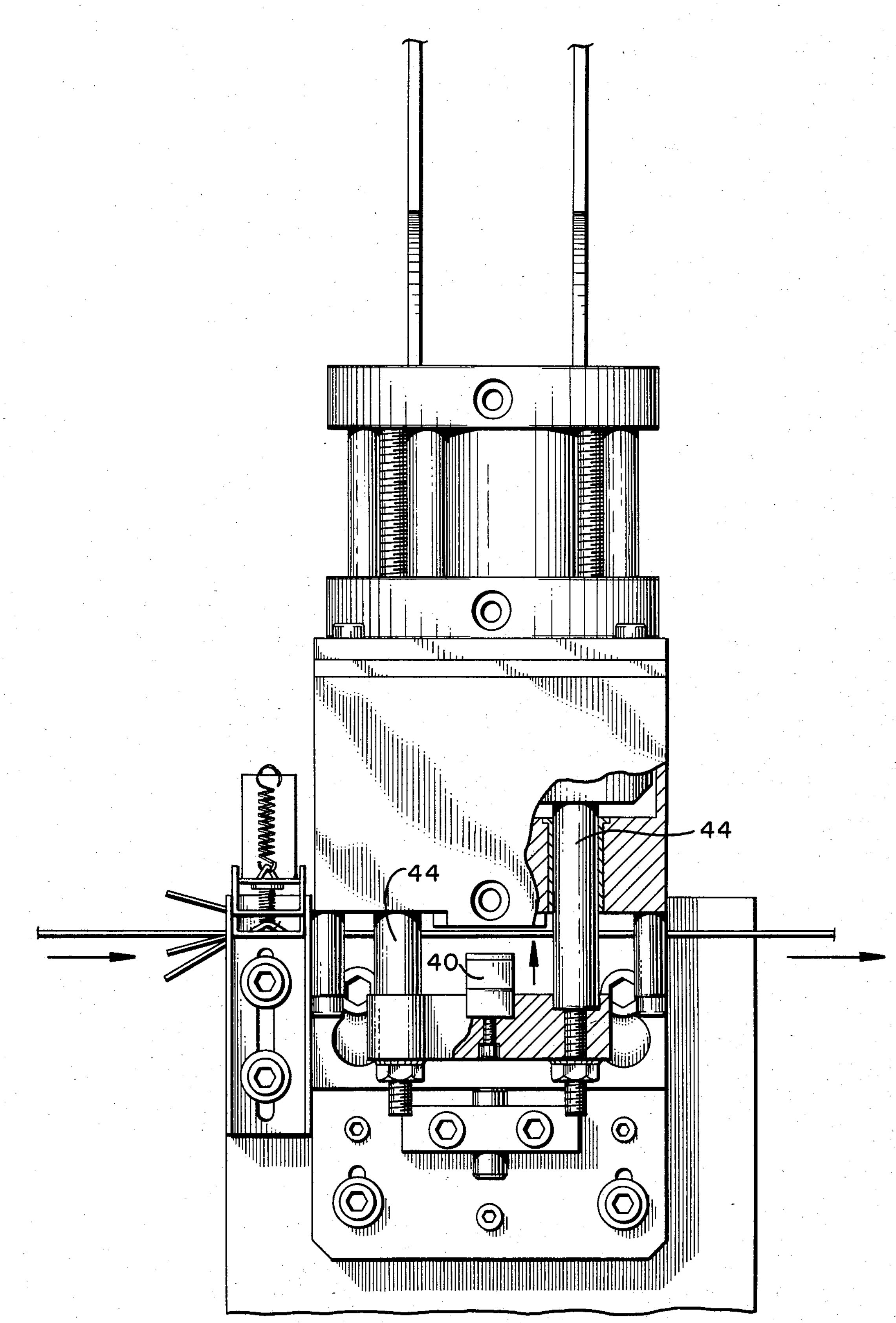
FIG. 4 is a front view, partially in section of the slat cutting device.
Figure 5:
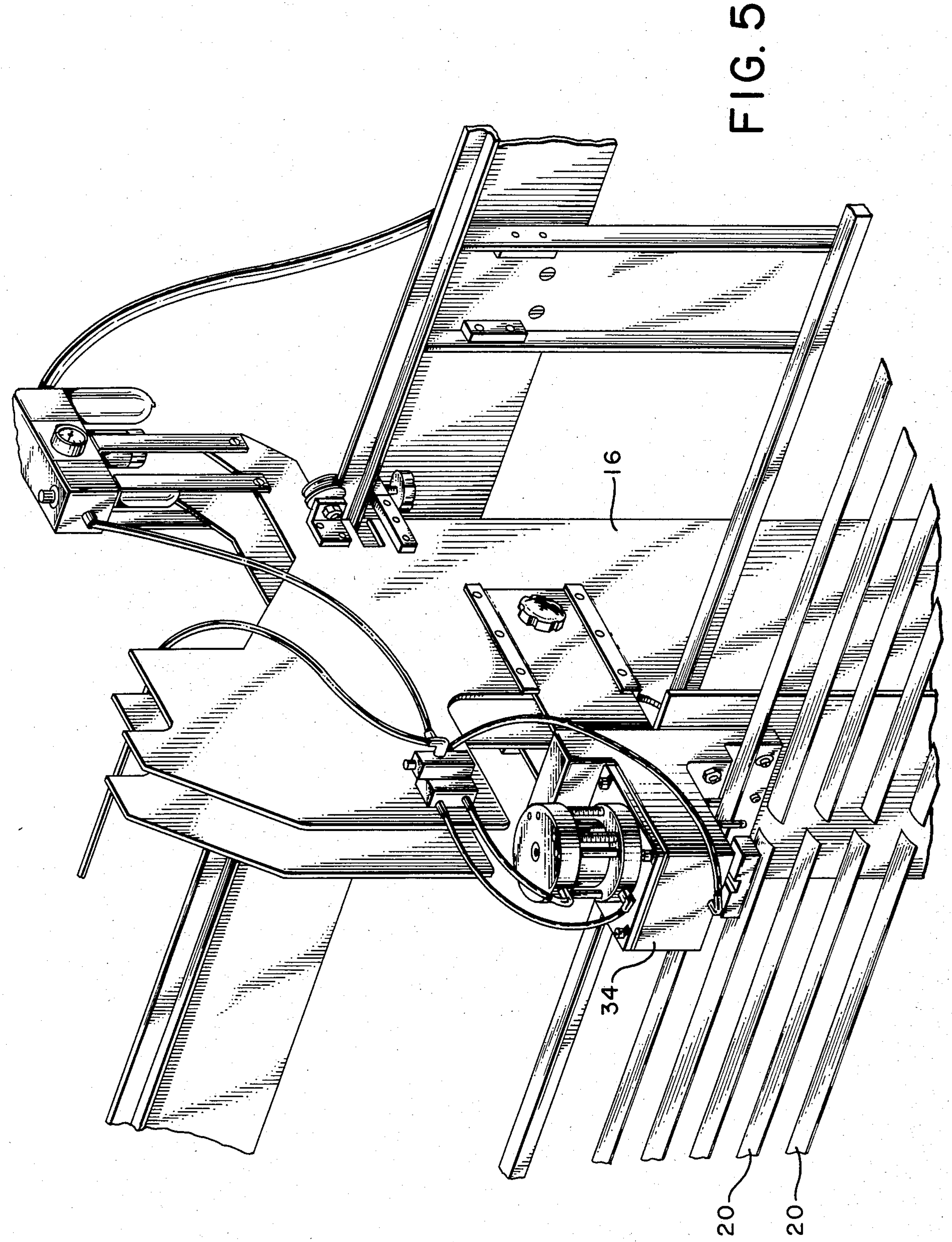
FIG. 5 is a perspective view of the slat cutting device.

The details of the slat cutter device are illustrated in FIGS. 2 and 3. It comprises a punch 40 and a die 42. Punch 40 is supported by a mounting plate 42 which in turn is supported by guide posts 44 in a housing 46. A conduit 48 is located above the die 34 for discharging scrap metal pieces along a path indicated by arrow 50. After the individual slats have been cut, two at a time, by the cutting device, the ladders are automatically moved downward, and with it the slats already between the rungs. After all slats have been cut for a particular venetian blind the entire blind is removed from the work station.

Figure 6:
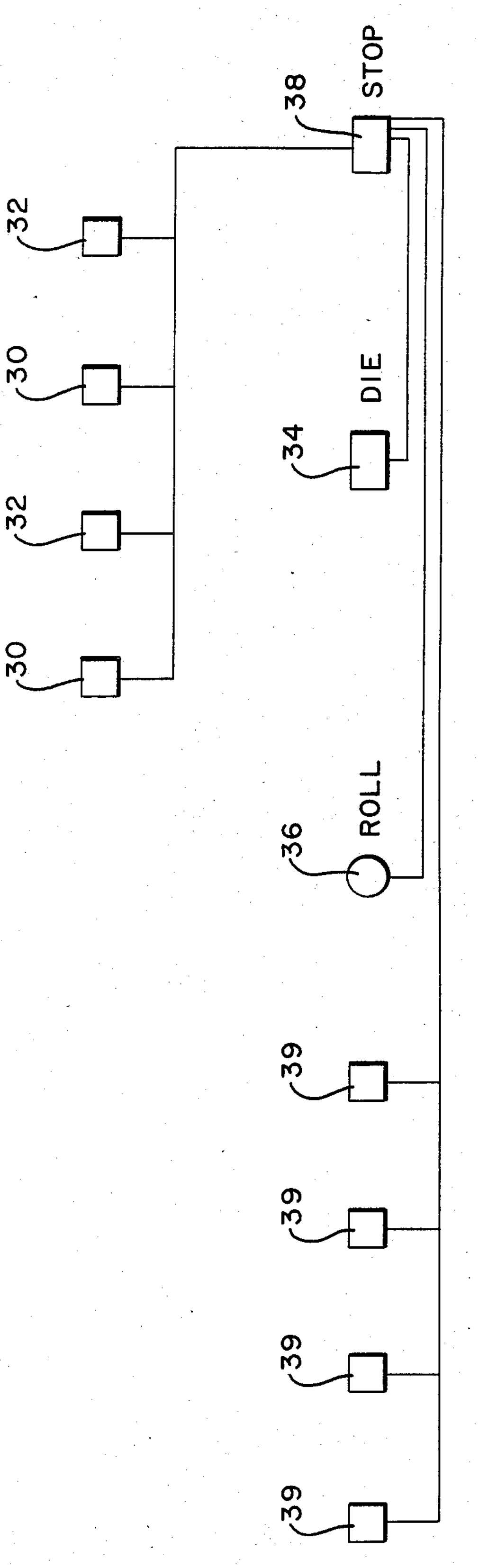
FIG. 6 is a block diagram showing the interconnection between the required elements of the machine.

FIG. 6 illustrates a block diagram for operating the blind making machine, showing the stop 38 connected to the ladder feed reels 30, 32 and the cutting die, 34 as well as to the dies 39 for the holes in the stock material, and the connection to the feeding roller 36.

I claim:

1. A method of producing a plurality of venetian blinds simultaneously, comprising the steps of:

(a) setting up a plurality of blind producing stations adjacent to each other; each station supporting a venetian blind head rail, a venetian blind bottom rail below said head rail, and a plurality of spaced venetian blind ladders parallel to each other and spaced over the width of the respective station; the head rail, bottom rail, and blind ladders of one station being separate from the head rail, bottom rail and blind ladders respectively of another station;

(b) cutting from a continuous supply of slat material a length corresponding essentially to the width of the plurality of stations; and simultaneously punching into said length of material openings at locations corresponding to the ladders in the finished plurality of blinds;

(c) feeding the cut length of slat material into the blind stations, through the ladders of the blinds, until the slat material engages a stop adjacent the last of said plurality of stations as seen from said supply;

(d) cutting the slat material between adjacent ones of said plurality of stations; and (e) repeating steps (b), (c) and (d) until a desired vertical length of blind between said head and bottom rails has been produced.

2. An apparatus for producing a plurality of venetian blinds simultaneously, comprising:

(a) a plurality of blind producing stations arranged adjacent to each other; each station having means for supporting a venetian blind head rail, means for supporting a venetian blind bottom rail below said head rail, and means for suspending a plurality of venetian blind ladders parallel to each other and spaced over the width of the respective station; the head rail, bottom rail, and blind ladders of one station being separate from the head rail, bottom rail and blind ladders respectively of another station;

(b) means arranged ahead of said stations for cutting from a continuous supply of slat material a length corresponding essentially to the width of the plurality of stations; and means for simultaneously punching into said length of material openings at locations corresponding to the ladders in the finished plurality of blinds;

(c) stop means behind the last of said stations as seen from said supply;

(d) means for feeding the cut length of slat material into the blind stations, through the ladders of the blinds, until the slat material engages said stop means; and (e) means located between adjacent ones of said plurality of stations for cutting the slat material.

3. An apparatus according to claim 2, wherein said cutting means located between stations is a cutting die.

* * * * *